United States Patent Office 2,920,587
Patented Jan. 12, 1960

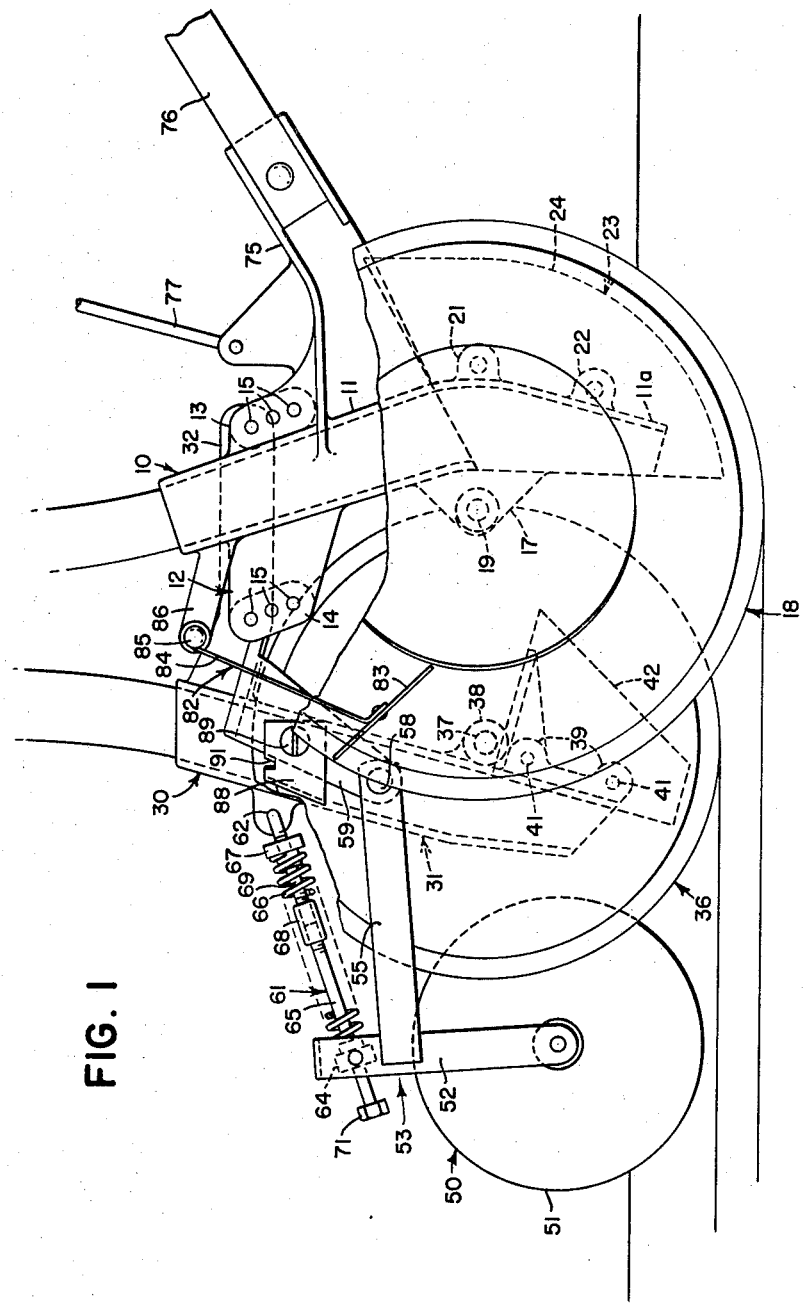

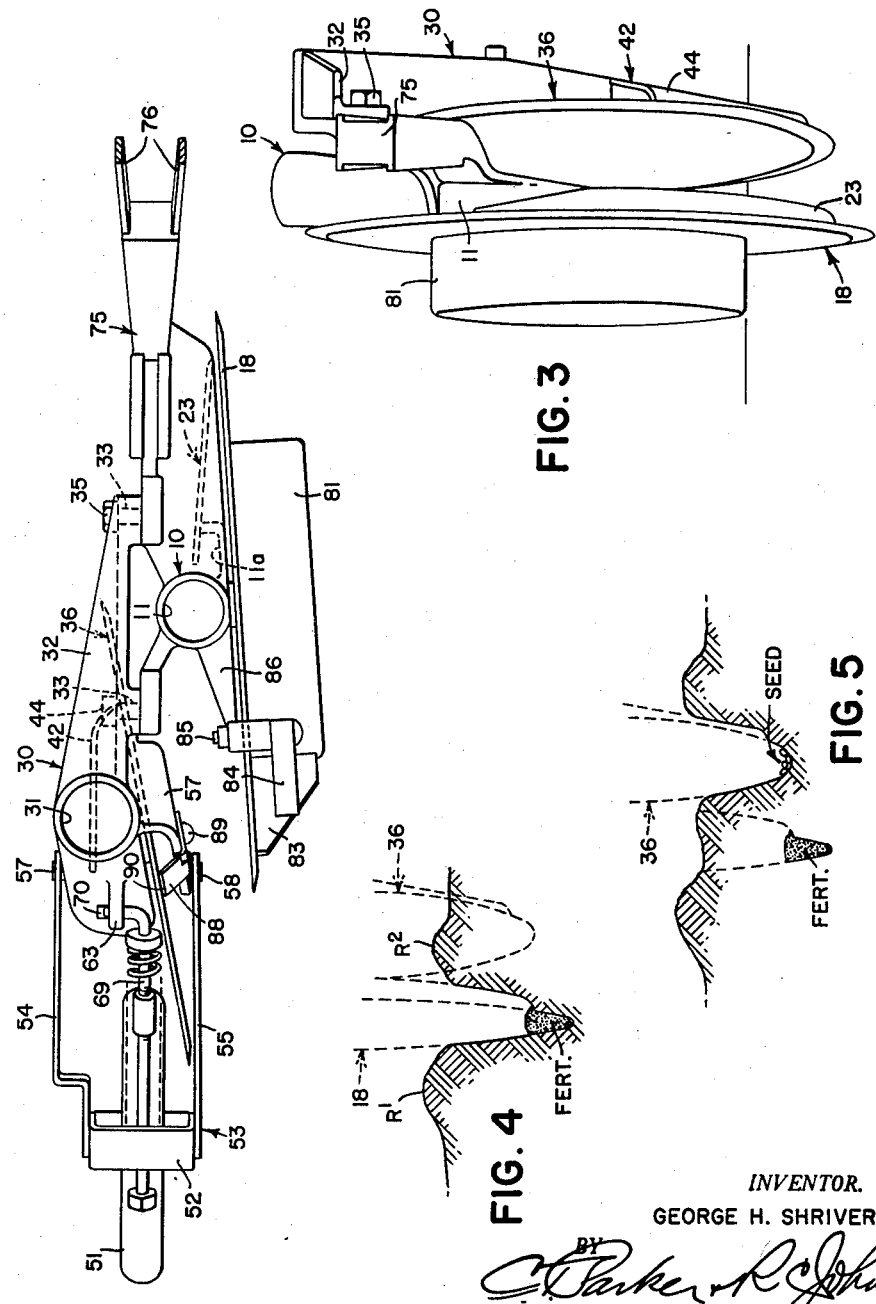

2,920,587

DUAL DISK FURROW OPENER

George H. Shriver, Silvis, Ill., assignor, by mesne assignments, to Deere & Company, a corporation of Delaware Application December 12, 1956, Serial No. 627,945

2 Claims. (Cl. 111—80)

The present invention relates generally to agricultural implements and more particularly to planting implements, such as a grain drill or the like.

The object and general nature of the present invention is the provision of new and improved furrow opener means that is so constructed and arranged so as to accommodate operating under narrow row spacing conditions while at the same time avoiding excessive length of the furrow opening units in a generally fore-and-aft direction. More specifically, it is a feature of this invention to provide fertilizer and seed furrow opening means in the form of disks arranged in generally parallel and partially overlapping relation, with associated supports, one for each disk, constructed to rotatably receive the disks and maintain them in approximate parallelism and with one disk somewhat in rear of the other, so as to provide, first, a fertilizer furrow opening disk and, slightly to the rear thereof, a seed furrow opening disk operating to displace some of the soil immediately behind the fertilizer furrow opener disk into the furrow opened by the latter disk before any seed is deposited in the seed furrow. A further feature of this invention is the provision of a press wheel adapted to engage the seed in the seed furrow and press the same into the soil, the press wheel being connected with the seed furrow opening disk set forth in relatively close coupled relation and disposed substantially directly behind the fertilizer and seed disk supports so as to accommodate relatively narrow row spacing.

These and other objects and advantages of the present invention will be apparent to those skilled in the art after a consideration of the following detailed description, taken in conjunction with the accompanying drawings, in which:

Fig. 1 is a side view of a furrow opener construction in which the principles of the present invention have been incorporated.

Fig. 2 is a top view of the construction shown in Fig. 1.

Fig. 3 is a front view of the construction shown in Fig. 1.

Fig. 4 is a diagrammatic view showing the fertilizer-receiving furrow.

Fig. 5 is a similar diagrammatic view showing the seed-receiving furrow.

Referring first to Fig. 1, the forward fertilizer furrow opening disk support is indicated in its entirety by the reference numeral 10 and comprises a generally vertical conduit section 11 and a generally fore-and-act extending attaching section 12 that is made up of forwardly and rearwardly extending attaching ears 13 and 14, each having a plurality of apertures 15, there being three in each apertured section, as shown in Fig. 1. The lower portion of the conduit section 11 carries an apertured lug 17 that rotatably receives a fertilizer furrow opening disk 18 with suitable bearing means 19, which may be conventional so far as the principles of the present invention is concerned. The lower portion of the conduit section 11 also carries a pair of forwardly extending lugs 21 and 22 to which a shoe 23, having a forwardly curved soil-entering edge 24, is connected. As can best be seen from Fig. 2, the shoe 23 is substantially flat, likewise the disk 18 is flat, the two being disposed in forwardly converging relation, the disk 18 making an angle of about 4° or 5° relative to the direction of forward travel, the shoe 23 making about the same angle in the other direction. Fertilizer is deposited in the furrow opened by the disk 18 by being delivered into the furrow through the tube section 11. At its lower portion, as indicated at 11a, the conduit section lies close to the disk 18.

The seed furrow opener disk support is indicated in entirety by the reference numeral 30 and includes a generally vertically disposed conduit section 31 and a generally horizontal forwardly disposed arm 32 forming a forwardly extending attaching section that is apertured, as at 33, and the spacing between the front and rear apertures 33 in the apertured portion 32 corresponds to the spacing between the openings 15 in the attaching ears 13 and 14 of the forward fertilizer disk support 10. Preferably, the openings 15 are threaded so as to receive fastening cap screws 35 that form means fixedly connecting the two disk supports rigidly together. A seed furrow opener disk 36 is carried by suitable bearing means 37 on an apertured lug 38 that forms disk-receiving means. The lower portion of the conduit section 31 is also formed with apertured lugs 39 to receive the fasteners 41 that secure a seed furrow shoe 42 to the disk support 30. The shoe 42, like the shoe 23, is preferably in the form of a flat plate. However, the seed furrow opening shoe 42 is curved at its forward edge, as indicated at 44, which edge is disposed closely adjacent the seed furrow opening disk 36. The latter is smaller in diameter than the fertilizer furrow opening disk 18, for generally it is desired to place the fertilizer at a greater depth than the seed. Also, it will be observed from Fig. 1 that the attaching arm 32 clears the adjacent portion of the seed furrow opening disk 36 so as to extend to and be connected with the attaching ears 13 and 14 on the fertilizer furrow opening disk support 10. It will be observed that there are three sets of openings 15, these being located so that the seed furrow opening disk may be disposed in three positions optionally, one about an inch above the fertilizer furrow opening disk, another about one-half inch above the fertilizer furrow opening disk, and the other position being on the same level as the fertilizer furrow opening disk.

The seed furrow opening disk support 30 is provided with press wheel means indicated in its entirety by the reference numeral 50. This unit includes a press wheel 51 that is adapted to run along the bottom of the seed furrow so as to press the seed down into the soil. The wheel 51 is journaled on the vertical standard portion 52 of a press wheel frame 53. The standard 52 consists of a U-shaped part to the sides of which generally fore-and-aft extending bars 54 and 55 are fixed at their rear ends, as by welding. The forward end of the bar 54 is pivotally connected with a lug 57 that is formed on the side of the disk support 30, opposite the disk 36 thereon, and the forward end of the press wheel frame bar 55 is pivotally connected to a stud 58 that forms a portion of a downwardly extending lug or bracket 59 that forms an integral part of the upper portion of the disk support 30. The lug 59 is formed so as to extend over the upper portion of the seed furrow opening disk 36 and to extend down into the space between the disks, thereby bringing the press wheel 51 up as close as practical to the seed furrow opening disk support 30. A rod 61 is pivotally connected at its forward end, as at 62, to an apertured lug 63 formed on or carried by the upper portion of the disk support 30. The rear end of the rod is slidable through a trunnion 64 carried by the upper portion of the U-shaped member forming the vertical standard 52. A spring 66 is connected to act between an abutment 67 on the forward portion of the rod 61 and against the trunnion 64 for the purpose of resiliently urging the press wheel 51 downwardly into engagement with the soil. Preferably, the rod 61 comprises a rear bolt 65 having its forward end threaded into a connecting sleeve 68 which also receives the rear threaded end of a forward rod 69 having a laterally turned end 70. The head 71 of the bolt 65 serves as a stop coacting with the trunnion 64 so that as the furrow opening means is lifted into a transport position (not shown), the press wheel unit 50 is also raised.

In the preferred construction, the furrow opening means described above is incorporated in a grain drill. To this end, the fertilizer disk support 10 is provided with a forward extension 75 that is adapted to be connected to a pair of conventional grain drill drag bars 76, the drag bars 76 being pivotally connected with the frame of the grain drill for generally vertical swinging. The position of the furrow opening unit is controlled by means of a pressure rod 77 that conventionally is connected with the grain drill raising and lowering means, and in addition, associated with the pressure rod 77 is a spring or the like by which down pressure may be exerted against the furrow opening means in the operating position of the grain drill. Conventional seed and fertilizer tubes are connected to the upper portions of the seed furrow opening disk support 30 and the fertilizer furrow opening disk support 10.

In order to insure the planting of the seed and the depositing of the fertilizer at the proper depth, I provide the fertilizer furrow opening disk 18 with a depth gauge wheel 81, the latter being secured in place on the disk 18 in concentric relation with respect thereto by any suitable means. In order to keep the ground engaging portions of the disk 18 and the depth gauging member 81 clean, I provide a scraper 82 that includes a plate 83 and an arm 84. The arm 84 is resilient and has its upper end fixed, as by a bolt 85, to a bracket 86 that is formed on the disk support 10. A disk scraper 88 is fixed by a bolt 89 to the upper part of the lug 59 and has an edge 90 that scrapes adhering soil from the disk 36. A lug 91 lies against the edge of the bracket 59 to position the scraper 88.

As will be seen from Fig. 3, the forward fertilizer furrow opening disk 18 and the seed furrow opening disk 36 are disposed closely adjacent one another. As will be seen from Fig. 2 the two disks are approximately parallel but in the preferred form the seed furrow opening disk 36 is disposed at a somewhat greater angle with respect to the direction of forward travel than is the fertilizer furrow opener disk 18. The reason for this arrangement is that, in the first place, the seed furrow opening disk is somewhat smaller in diameter than the front disk 18, and hence requires a slight additional amount of soil pressure to insure proper rotation of the disk. In the second place, the furrow formed by the rear disk 36 is quite close to the furrow formed by the front disk 18, and hence the relatively small amount of soil between the two disks, as shown in Fig. 3, does not offer quite as much resistance as undisturbed soil. Furthermore, as shown in Figs. 4 and 5, after the fertilizer furrow opening disk 18 has passed through the ground, there is generally speaking a ridge of soil along each side thereof, as indicated in Fig. 4 at R¹ and R², and when the immediately following seed furrow opening disk 36 opens the seed furrow, a considerable part if not all of the soil lying between the disks is pushed laterally into and substantially fills the fertilizer furrow, as will be seen from Fig. 5. In other words, the fertilizer furrow is filled by pushing a major portion of the soil between the disks over into the fertilizer furrow. In this way, the fertilizer is deposited, usually deeper than the seed, and is separated from the subsequently deposited seed by an appreciable amount of soil so that the fertilizer never comes into direct contact with the seed.

Any suitable means may be provided for filling the seed furrow, but since such means does not form a part of the present invention, it has not been illustrated in the accompanying drawings. It will be understood, of course, that before the seed furrow is filled, the press wheel 51 presses the deposited seed into intimate and firm relationship with respect to the bottom of the seed furrow.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. In a planting implement, such as a grain drill, a pair of approximately parallel furrow opening disks arranged so that one is disposed partially behind the other in generally side by side overlapping relation, with the rear disk placed with its center ahead of the rear edge of the forward disk, and each being disposed at an angle to the direction of travel when planting and both being angled to the same side relative to the line of travel of the implement, whereby the rear disk throws soil toward the forward disk and both disks throw soil in the same general direction, the lateral spacing being such that the rear disk forms a second furrow alongside a first furrow formed by the forward disk and deposits soil from the second furrow into the first furrow, means lying generally between said disks to deposit fertilizer in the first furrow before said soil is directed thereinto by the rear disk, and means at the side of the rear disk opposite the fertilizer depositing means to deposit seed into the second furrow.

2. In a planting implement, a first generally flat disk disposed generally upright and arranged to lie at an acute angle relative to the direction of forward travel when planting so as to form a furrow by displacing the soil outwardly at one side of the disk, a second generally flat disk also generally upright and arranged to lie at an acute angle relative to the direction of forward travel and disposed in spaced relation from the other side of said first disk so as to displace soil toward said first disk, and support means for said disks to maintain the rear disk spaced laterally away from said other side of the front disk so as to engage soil untouched by the front disk and deposit a major portion of the soil moved by said rear disk into the furrow opened by said other disk.

References Cited in the file of this patent

UNITED STATES PATENTS

| | | |
|---|---|---|
| 358,247 | Arnett | Feb. 22, 1887 |
| 615,727 | Mast | Dec. 13, 1898 |
| 736,369 | Dynes et al. | Aug. 18, 1903 |
| 745,197 | Kingsbury | Nov. 24, 1903 |
| 1,104,725 | Aspinwall | July 21, 1914 |
| 1,254,266 | Patric | Jan. 22, 1918 |
| 2,106,901 | Rassman | Feb. 1, 1938 |
| 2,159,652 | Brunner | May 23, 1939 |
| 2,341,143 | Herr | Feb. 8, 1944 |
| 2,341,795 | Kriegbaum et al. | Feb. 15, 1944 |
| 2,611,331 | O'Neil | Sept. 23, 1952 |
| 2,713,836 | Ajero | July 26, 1955 |
| 2,769,412 | Holle | Nov. 6, 1956 |